Aug. 9, 1955  P. A. BANCEL  2,714,881
CONTROL SYSTEM FOR INTERNAL-COMBUSTION ENGINES
Filed May 6, 1953  4 Sheets-Sheet 3

INVENTOR
PAUL A. BANCEL
BY
HIS ATTORNEY

United States Patent Office 2,714,881
Patented Aug. 9, 1955

2,714,881

CONTROL SYSTEM FOR INTERNAL-COMBUSTION ENGINES

Paul A. Bancel, Montclair, N. J., assignor to Ingersoll-Rand Company, New York, N. Y., a corporation of New Jersey Application May 6, 1953, Serial No. 353,385

6 Claims. (Cl. 123—119)

This invention relates to a speed control system for internal-combustion engines, and more particularly to a speed control system for internal-combustion engines having supercharging.

One object of this invention is to control the speed of an internal-combustion engine over a predetermined torque range by controlling the supply of fuel and air to the engine in response to variations in speed of the engine and variations in the pressure of air or fuel supplied to the engine.

A further object of this invention is to provide such a control which is capable of adjustment to compensate for variations in density of the air supplied to the engine.

Figure 1:
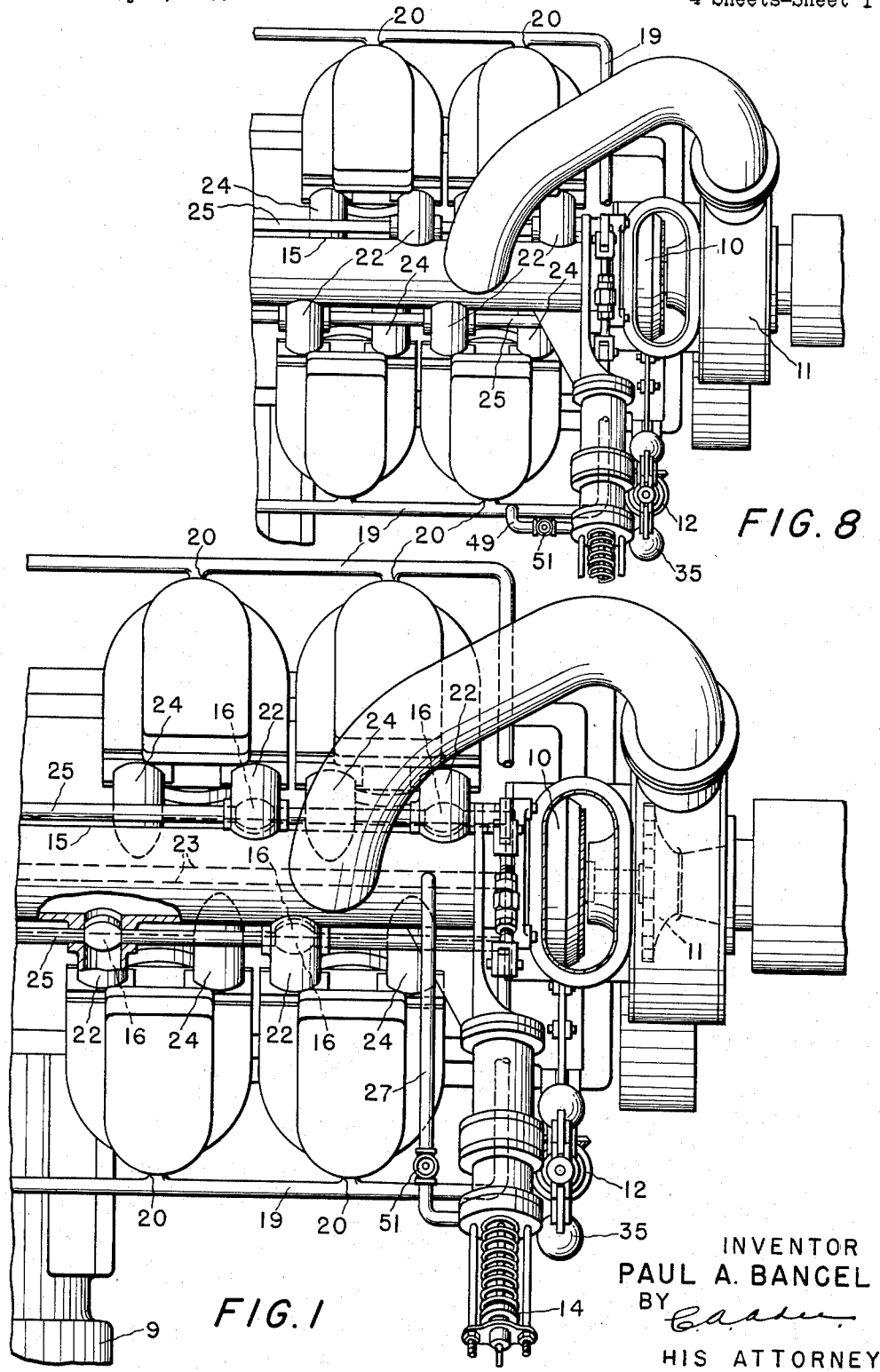
Figure 2:
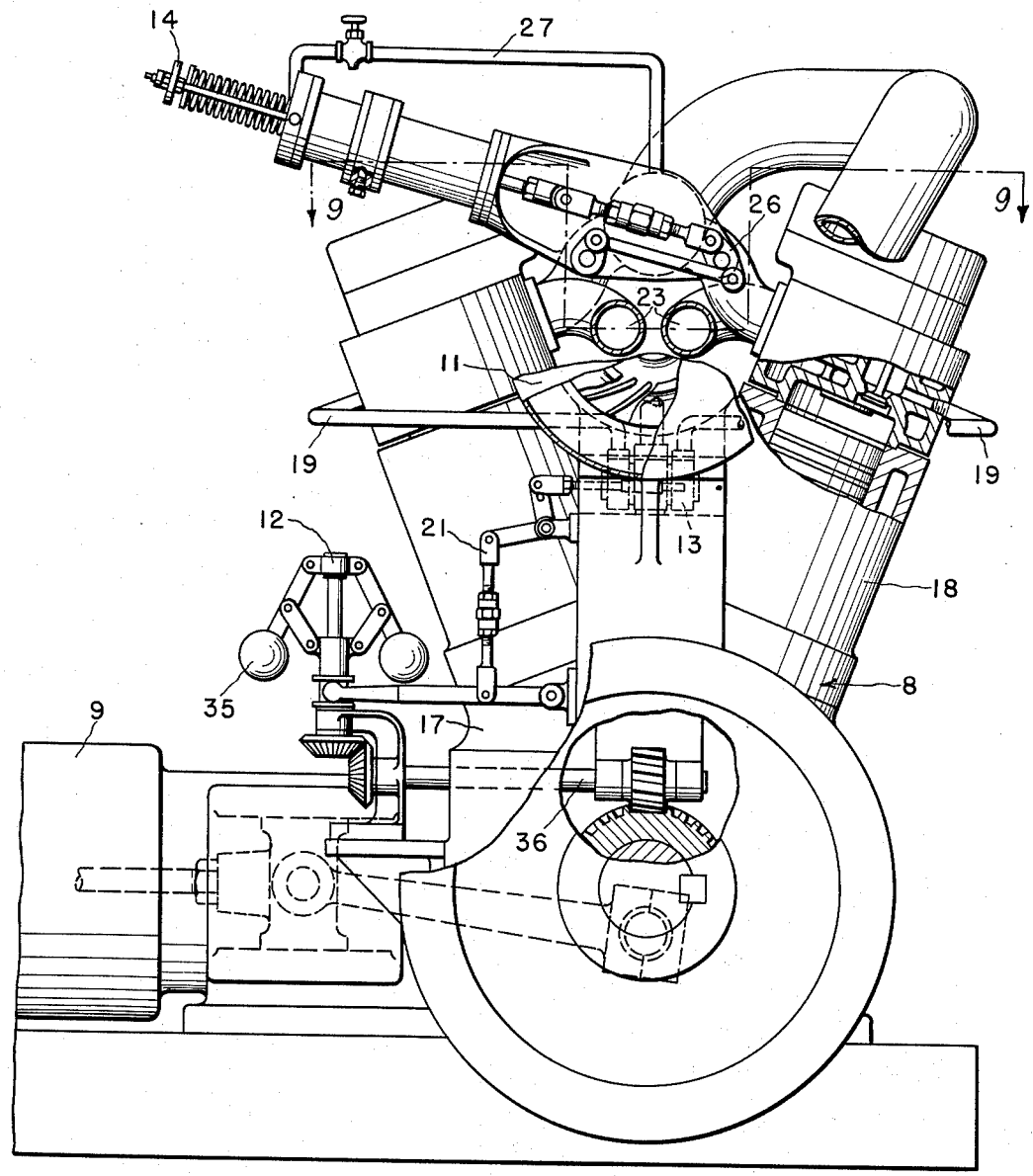
Figure 3:
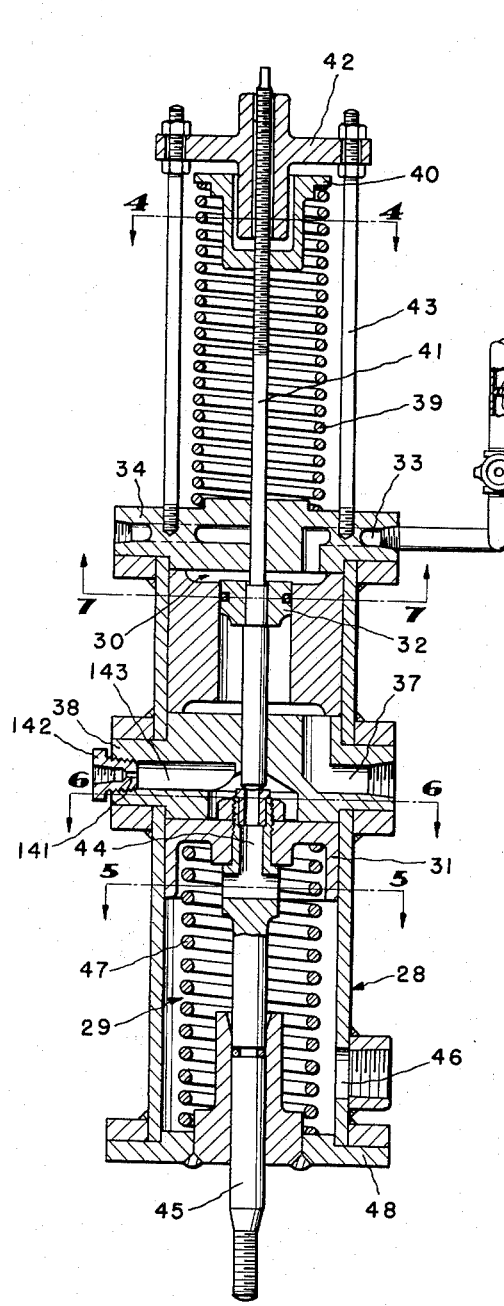
Figure 4:
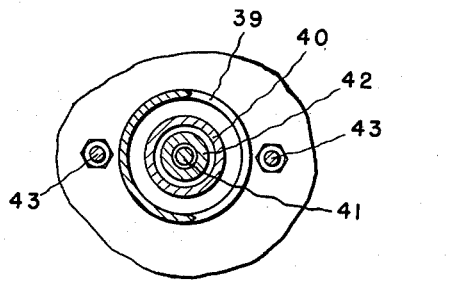
Figure 5:
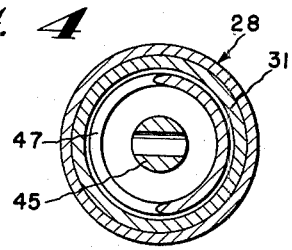
Figure 6:
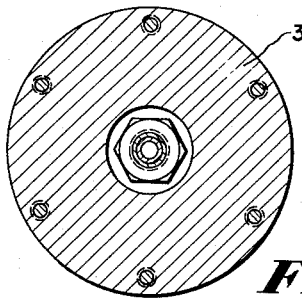
Figure 7:
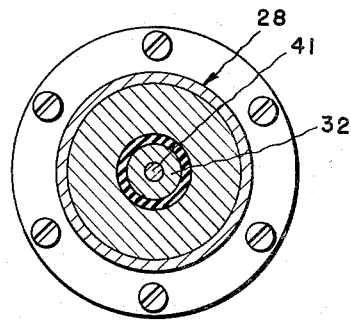
Figure 9:
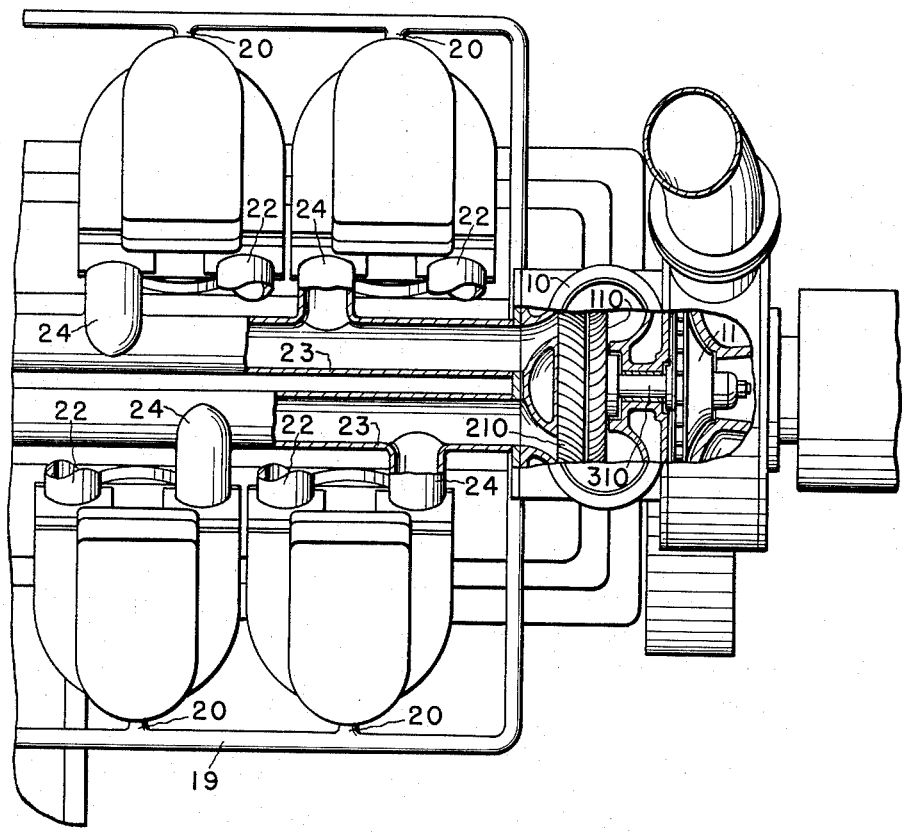

Further objects will become apparent from the following description and drawings in which, Figure 1 is a top view of an engine provided with a control system constructed in accordance with the practice of the invention, Fig. 2 is an end view of the engine, Fig. 3 is a longitudinal sectional view of the servo-mechanism for actuating the air inlet valves of the engine, Figs. 4, 5, 6 and 7 are transverse views taken through Fig. 3 looking in the direction of the arrows, Fig. 8 is a view of the engine provided with a modified form of the control system, and Fig. 9 is a longitudinal section of the engine shown in Fig. 2 and taken along the line 9—9.

Referring to the drawings, Figure 1 shows a V-type engine 8 arranged to drive compressors 9 (shown in part only). Adapted to the engine 8 is a gas turbine 10 powered by the engine exhaust and connected by shaft 310 to drive a blower 11 for supplying air under pressure to the engine. Control of the engine speed under varying torque (load) conditions is effected by a control system comprising a conventional speed governor 12 driven by the engine 8 and arranged to actuate a gas valve 13 for controlling the flow of fuel to the engine in response to variations in speed of the engine, and a regulator 14 adapted to act in response to variations in pressure in the air (or fuel) manifold to actuate intake butterfly valves 16 controlling the flow of air to the engine cylinders 18.

With this arrangement, whenever the load on the engine varies so that the engine tends to, say for example, overspeed, the speed governor 12 acting in response to this variation in engine speed actuates the valve 13 to decrease the flow rate of fuel to the engine. This decrease in fuel supply results in a decrease in speed of the gas turbine which, in turn, causes the pressure of the air supply to fall. The regulator 14, in response to this decrease in air supply pressure, actuates the intake valves 16 to decrease the flow of air to the engine and thereby re-establish the correct proportion of fuel and air supplied to the engine for the given load condition. In the event the speed of the engine decreases, the control elements act in a reverse manner to return the engine speed to the desired value.

If the ambient air temperature remained relatively constant at all times, the previously described control system would provide satisfactory engine control under all load conditions. In many installations, however, due to climatic and other conditions, the air temperature will vary over a considerable range (e. g. 50 degrees F.) within a twenty-four hour period. Such a variation in temperature results in a variation in density of the air which in turn disturbs the control settings for any given pressure value in the air or fuel manifold.

Specifically, when the ambient air temperature is at its low point in the twenty-four hour cycle, the air is relatively dense and the pressure in the air manifold is relatively high (e. g. 4 pounds per square inch at full load). Assuming that the control system is adjusted to operate satisfactorily at this manifold pressure, when the ambient temperature is at its high point in the cycle, the air manifold pressure will drop to a value (e. g. 3.5 p. s. i. at full load) due to the decrease in density of the air and the characteristic of the blower—i. e., the output pressure of the blower at constant speed varies, within limits, in direct proportion to the variations in the density of the air compressed. Thus, at a time when, due to the decrease in air density, a greater volume of air is required for ideal operation of the engine, the discharge pressure of the blower is decreased and the control system acts to throttle the air supplied to the engine. This is, of course, a cumulative effect in the wrong direction leading to erratic control of the engine.

This difficulty cannot be avoided by making the regulator 14 responsive to variations in fuel manifold pressure. With this control system, a variation in air temperature results in a corresponding variation in pressure of the air manifold and, accordingly, in the engine cylinder. This pressure change disturbs the air-fuel ratio in the engine cylinder which tends to vary the engine speed. The speed regulator then acts to maintain the speed constant and accordingly varies the fuel pressure. For example, if the air density rises, the discharge pressure of the blower increases thereby increasing the pressure of air delivered to the cylinder. The speed governor then acts to increase the pressure of the fuel delivered to the engine cylinder. This increase in gas pressure actuates the regulator 14 to open further the intake valves 16 thereby increasing the supply of air to the engine at a time when a lesser supply is desirable.

This difficulty arising as a result of variations in ambient air temperature is avoided by the present invention by the provision of a means (50—51) for varying the pressure of the pilot fluid (air or fuel as the case may be) for actuating the regulator 14. Thus the desired air intake valve setting for a given air or fuel manifold pressure may be obtained by the simple expedient of adjusting this means, and accordingly these settings may be readily varied in accordance with variations in ambient air temperature to compensate for the adverse effect such variations have on the control system.

Referring more particularly to the construction of the engine and the control system, the engine includes a housing 17 on which are mounted cylinders 18 aligned along the opposite sides of the housing 17 and inclined with respect to a longitudinal vertical plane through the housing 17 in the manner characteristic of the V-type engine.

The means by which fuel—in this instance a gaseous fuel—is supplied under pressure to the cylinders 18 is shown in the form of a pair of fuel manifolds 19 running along the opposite sides of the engine adjacent the cylinders 18 and having short branch pipes 20 leading into the cylinders 18. The flow of fuel to the cylinders is controlled by means of the gas valve 13 actuated through linkages 21 by the speed governor 12. The governor 12 may be of any conventional type which is adapted to increase the fuel supply in response to a load increase on the engine, and to decrease the fuel supply whenever such load decreases. For the purpose of illustration, the governor is shown as being of the centrifugal type having flyweights 35 rotated by a countershaft 36 driven by the engine 8.

The means for conducting air to the cylinders 18 from the blower 11 comprises a supply manifold 15 having short branch pipes 22 leading to the cylinders 18. Similarly constructed manifolds 23 located, as is the manifold 15, along and within the V formed by the cylinders 18 are provided with branch pipes 24 leading to the cylinders 18 for the escape of the exhaust of the cylinders. Such exhaust is conducted by the manifolds 23 to the nozzles, or guide vanes, 210 of the turbine 10 and directed thereby against the turbine buckets 110 to drive the turbine.

The flow of air into the cylinders 18 is controlled by butterfly valves 16 located in each of the intake branch pipes 22 and operated in unison by means of rods 25 connected thereto. The rods 25 are connected through linkage 26 to the regulator 14 which may be of any conventional type adapted to act in response to slight variations in gaseous pressure. Such response of the regulator is transmitted through the linkage 26 to rotate the rods 25 to open or close the butterfly valves 16.

In the embodiment of the invention illustrated in Figs. 1 and 2, the regulator 14 (the construction of which is explained in detail hereinafter) is communicated with the air intake manifold 15 through a pipe 27 and is actuated in response to variations in pressure in the manifold 15 for controlling the supply of air into the cylinders 18. More particularly, whenever the load on the engine changes such that the speed governor 12 acts to vary the supply of fuel to the cylinders 18, the air pressure in the manifold 15 will be varied accordingly thereby actuating the regulator 14 to rotate the rods 25 for positioning the butterfly valves 16 to change the supply of air to the cylinders 18.

The purpose of locating the valves 16 in the intake pipes 22 adjacent the cylinders 18 is to prevent blowback from the exhaust manifold 23 through the cylinder 18 into the intake manifold 15. In supercharged engines having valve overlap there is a period over which the inlet and exhaust valves are both open. Assuming that only a single inlet valve is provided and located at the entrance of the intake manifold, during relatively high load operations—at which time there is very little throttling of air—the pressure in the intake manifold exceeds the pressure in the exhaust manifold so that there is no danger of blowback. However, when the engine is operating at normal or lower load levels so that the intake valve is positioned to throttle the flow of air into the manifold, there is a period when a negative pressure, or vacuum, exists in the intake manifold and a slight positive pressure, relative to the inlet pressure, exists in the exhaust manifold. Accordingly, exhaust gas will flow into the intake manifold during the valve overlap period thereby disrupting the efficient operation of the engine—that is, such exhaust would be drawn into the cylinder on the next suction stroke causing the engine to miss. This difficulty has been overcome in the present instance by locating the valves 16 between the air inlet manifold and each cylinder so that any tendency to blowback into the intake is limited to the relatively small volume in the branch pipe 22 between the valve 16 and the cylinder 18.

Referring in greater detail to the construction of the regulator, or servo-mechanism, 14 (see Figures 3–7), the regulator comprises a casing 28 defining a power chamber 29 and a pilot chamber 30 in which reciprocate, respectively, a power piston 31 and a pilot piston 32. The pilot piston is urged in one direction (downward as viewed in Fig. 3) by pressure fluid conducted from the air manifold 15 to one end of the pilot chamber 30 through the pipe 27 and a passage 33 formed in the end cover 34 of the casing 28. The opposite end of the chamber 30 is communicated with the atmosphere through a passage 37 formed in a partition, or cylindrical joint member 38, separating the chambers 29 and 30. The fluid pressure force exerted in the downward direction on the piston is resisted by a spring 39 biased between the end cover 34 and a spring retainer 40 threaded on an end portion of a piston rod 41 extending through the pilot piston 32. A guide member 42 mounted on studs 43 threaded in the cover 34 supports and guides said end portion of the rod 41.

With this arrangement the pilot piston 32 is actuated in response to variations in pressure in the air manifold 15 Movement of the piston 32 is utilized to regulate the pressure of power fluid in the chamber 29, thereby controlling movement of the power piston 31 which is connected to actuate the butterfly valves 16. In furtherance to this end, the lower or opposite end of the piston rod 41 extends slidably through the partition 38 and serves to control the exhausting of pressure fluid from the power chamber 29. More particularly, power fluid is supplied (from a source not shown) to one end of the power chamber 29 through an orifice 141 in a plug 142 threaded in a passage 143 formed in the partition 38, and is exhausted therefrom through a passage 44 formed in the piston rod 45 and communicating the opposite sides of the piston 31. The opposite, or lower, end of the chamber 29 is communicated with the atmosphere through an opening 46 so that pressure fluid flowing from the upper end of the chamber 29 through the passage 44 into the lower portion of chamber 29 (i. e., that portion of the chamber 29 below the piston 31) is exhausted to the atmosphere.

In furtherance to the end that the pilot piston 32 controls the movement of the power piston 31, the lower end of the rod 41 is arranged co-axially with the mouth of the passage 44 such that movement of the rod 41 towards the piston 31 tends to reduce the flow of pressure fluid through the passage 44 and thereby increase the pressure in the upper portion of the power chamber. Movement of the rod away from the piston 31 increases the flow of pressure fluid through the passage 44 and thereby decreases the pressure in the power chamber. Thus the piston 31 assumes a position relative to the rod 41 such that the force exerted thereon by the power fluid acting against the face of the piston 31 equals the force exerted by a spring 47 biased between the piston 31 and the end cover 48.

For example, assume that the air manifold pressure increases, thereby increasing the force, say 1 pound, exerted on the pilot piston 32. The pilot piston accordingly moves downwardly until the force exerted by the spring 39 increases 1 pound, due to compression thereof, to counter-balance the increase in fluid force. The downward movement of the piston 32 moves the piston rod 41 to decrease the flow of fluid through the passage 44. This decrease in flow results in an increase in pressure of the fluid acting against the face of the piston 31. The piston 31 moves downwardly compressing the spring 47 and simultaneously increasing the flow area through the mouth of the passage 44 thereby decreasing the pressure of the fluid acting against the face of the piston 31 until a balanced condition is again established.

With this arrangement then, slight changes in manifold air pressure may be utilized to actuate the butterfly valve 16 and, inasmuch as the pressure of the power fluid actuating the power piston 31 is in now way dependent on the changes of pressure in the manifold 15, a few ounces of pressure change in the manifold 15 may be utilized to control a force of several pounds necessary for actuating the butterfly valves.

As was previously noted experience has shown that with this control system a means should be provided for varying the pressure of the air supplied to the pilot chamber 30 to compensate for variations in the engine ambient air temperature. That is, if the butterfly valve setting remained the same for a given engine load regardless of air temperature variations, the quantity of air supplied to the engine would be excessive at low ambient temperatures and insufficient at high ambient temperatures merely due to variations in density of the air. This undesirable condition is magnified by the fact that centrifugal blowers have the characteristic of having the discharge pressure vary inversely, within limits, with variations in temperature of the air at the intake.

The means for varying the pressure of the air supplied to the pilot chamber 30 is here shown in the form of an orificed plate 50 in the pipe 27 (or pipe 49 discussed later) and a conventional bleed valve 51 located in the pipe 27 (or 49) downstream of the plate 50. Thus by opening the valve 51 and bleeding air to the atmosphere from the pipe 27 the pressure in the pipe 27 downstream of the orifice 52 is reduced thereby lowering the pressure of the air supplied to actuate the pilot piston 32. Inasmuch as the pressure of this air determines the position of the butterfly valves 16, the position of the butterfly valves 16 for any given fuel valve setting or air manifold pressure may thus be varied as required by variations in the temperature of the air to maintain the proper proportions of fuel weight and air weight supplied to the engine. Stated in another way, the control system varies the butterfly valve openings in substantially a straight line fashion, as compared to load, in response to load variations. By virtue of the control means 50—51 the slope of this straight line function can be pre-selected to suit the particular ambient air condition. Each setting of the control means—and the number of settings available is infinite—is the equivalent of substituting a new spring scale for spring 39.

In the other form of the invention, illustrated in Figure 8, the servo-mechanism 14 is arranged to actuate the air inlet valve 16 in response to variations in pressure in the gas manifold 19, instead of variations in pressure in the air manifold 15. In furtherance to this end, a pipe 49 is connected between the passage 33 in the servo-mechanism and the gas manifold 19. All other structural and functional relationships of the various elements of the control system are similar to the control system shown in Figures 1 and 2.

Reviewing briefly the operation of the control system, assume that the engine is operating at part load and that this load is suddenly decreased such that the engine tends to overspeed. The flyweights 35 are forced outward by centrifugal force, actuating the gas valve 13 through the linkage 21 to reduce the pressure of fuel supplied to the engine.

In the form of the invention illustrated in Figure 8, this reduction in gas pressure in the manifold 19 results in a decrease in pressure in the pilot chamber 30 permitting the spring 39 to move the piston 32 upward thereby decreasing the pressure of the power fluid in the chamber 29, by increasing the rate of flow of such fluid through the passage 44. The power piston 31 then moves upward under the influence of the spring 47 to actuate the linkage 26 and rods 25 to move the valve 16 to throttle the air intake.

On the other hand, if the invention is of the form shown in Figures 1 and 2, the decrease in fuel pressure results in a decrease in speed of the gas turbine 10 and blower 11. The reduction in speed of the blower 11 results in a lower discharge pressure and pressure of air in the manifold 15. This decrease in pressure in the air manifold results in a decrease in pressure in the chamber 30 and the servo-mechanism 14 responds in the same manner as discussed hereinbefore in connection with the modified form of the invention.

In the event the load on the engine 8 is increased such that the engine speed tends to decrease, this decrease in speed causes the flyweights 35 to move inwardly under gravitational force to open the gas valves 13 increasing the gas pressure in the manifold 19.

In the form of the invention shown in Figure 8 such increase in pressure in the fuel manifold results in increase in pressure in the pilot chamber 30 moving the pilot piston 32 downward thereby increasing the pressure of power fluid in the chamber 29 by decreasing the rate of flow through the passage 44. The power fluid moves the power piston 31 downward to open the valve 16 in the manner discussed hereinbefore.

In the form of the invention illustrated in Figures 1 and 2, such increase in gas pressure results in a higher speed of the gas turbine and blower, thereby increasing the pressure in the air manifold 15 resulting in operation of the regulator 14 in the manner discussed in connection with the form of the invention shown in Fig. 8.

In the event of a rise in density of the ambient air, such that the regulator, in either form of the invention, tends to supply an excess of air to the engine, the bleed valve 51 is opened sufficiently to lower the pressure in chamber 30 to a value whereat the desired setting of the valves 16 for a given manifold pressure is obtained. Conversely, if the air density drops below some norm, such that the regulator tends to reduce the supply of air to the engine below the desired amount, then the bleed valve 51 is closed sufficiently to increase the pressure in chamber 30 to reestablish the proper relationship between the valve settings and manifold pressure. In absence of automatic means to determine the proper setting of the valve 51 for a given air temperature, the settings may be made manually to maintain the engine exhaust temperature within prescribed limits and this will result in substantially the proper setting of valve 51.

While I have shown and described specific forms of my invention, it is to be understood that various changes and modifications may be made without departing from the spirit of teh invention as set forth in the appended claims.

I claim:

1. The combination with an internal-combustion engine having a plurality of cylinders, an air intake manifold, branch pipes leading from the manifold to said cylinders, air valves in said branch pipes, a blower for supplying air under pressure to the manifold, means driven by the engine for driving the blower, a fuel manifold for supplying fuel to said cylinders, a fuel valve for controlling flow through the fuel manifold, a speed governor driven by the engine and connected to said fuel valve and acting in response to variations in speed of the engine for actuating the fuel valve, a fluid pressure operated servo-mechanism connected to actuate the air valves, and a conduit connected between the servo-mechanism and one of said manifolds for supplying pressure fluid to actuate the servo-mechanism.

2. The combination set forth in claim 1 in which valve means are provided to vary the pressure of the fluid supplied to the servo-mechanism.

3. The combination set forth in claim 2 in which said valve means comprises an orificed member in said conduit and a bleed valve in said conduit between the orificed member and the servo-mechanism.

4. The combination with an internal-combustion engine having a blower for supplying air to the engine, a speed governor driven by the engine and adapted to be connected to actuate a fuel valve for the engine in response to variations in speed of the engine, a control mechanism for connection with a valve for controlling the pressure of air supplied to the engine, and means for communicating the control mechanism with the discharge of the blower for actuating said mechanism in response to variations in discharge pressure of the blower.

5. The combination with an internal-combustion engine having a blower for supplying air to the engine, of a fuel valve for controlling the flow of fuel to the engine, an air intake valve for controlling the pressure of air supplied to the engine by the blower, a speed governor driven by the engine and connected to actuate said fuel valve in response to variations in the speed of the engine, a control mechanism connected to operate the air intake valve in response to variations in discharge pressure of the blower, a conduit for supplying pressure fluid to operate said control mechanism, and means adapted to said conduit for varying the pressure of fluid supplied to said control mechanism in accordance with variations in ambient air temperature.

6. The combination with an internal-combustion engine having a plurality of cylinders, an air intake manifold, branch pipes leading from the manifold to said cylinders, valves in said branch pipes, a blower for supplying air under pressure to the manifold, means driven by the engine for driving the blower, a fuel valve for controlling the supply of fuel to the engine, a speed governor driven by the engine and connected to the fuel valve for actuating the fuel valve in response to variations in speed of the engine, a servo-mechanism acting in response to variations in pressure in the manifold to actuate the first said valves, means for conducting air from said manifold to actuate the servo-mechanism, and means for connecting the servo-mechanism with the first said valves for operating said valves in unison.

No references cited.